United States Patent [19]
Khalidi et al.

[11] Patent Number: 5,561,799
[45] Date of Patent: *Oct. 1, 1996

[54] EXTENSIBLE FILE SYSTEM WHICH LAYERS A NEW FILE SYSTEM WITH AN OLD FILE SYSTEM TO PROVIDE COHERENT FILE DATA

[75] Inventors: Yousef A. Khalidi, Sunnyvale; Michael N. Nelson, San Carlos, both of Calif.

[73] Assignee: Sun Microsystems, Inc., Mountain View, Calif.

[ * ] Notice: The term of this patent shall not extend beyond the expiration date of Pat. No. 5,452,447.

[21] Appl. No.: 584,878

[22] Filed: Jan. 11, 1996

Related U.S. Application Data

[63] Continuation of Ser. No. 78,714, Jun. 17, 1993, abandoned.
[51] Int. Cl.$^6$ ................................................. G06F 17/30
[52] U.S. Cl. ................... 395/600; 395/650; 364/DIG. 1; 364/222.81; 364/282.3; 364/283.1
[58] Field of Search ...................................... 395/600, 650

[56] References Cited

U.S. PATENT DOCUMENTS

| | | | |
|---|---|---|---|
| 5,014,192 | 5/1991 | Mansfield et al. | 395/600 |
| 5,202,982 | 4/1993 | Gamlich et al. | 395/600 |
| 5,297,283 | 3/1994 | Kelly, Jr. et al. | 395/650 |
| 5,367,635 | 11/1994 | Bauer et al. | 395/200 |
| 5,377,323 | 12/1994 | Vasudevan | 395/200 |
| 5,452,447 | 9/1995 | Nelson et al. | 395/650 |

OTHER PUBLICATIONS

"A Layered Approach to File System Development" by J. Heidemann et al., Technical Report CSD-910007, Mar. 1991.

"File System Development with Stackable Layers" DRAFT Report by J. Heidemann et al., Mar. 28, 1992.

Tait et al, "Service Interface and Replica Management Algorithm for Mobile File System Clients", PROC of the First International Conference on Parallel and Distributed Information Systems, 4–6 Dec. 1991, pp. 190–197.

Znati et al, "A Simulation Basen Analysis of Naming Schemes for Distributed Systems", PROC of the 25th Annual Simulation Symposium, 6–9 Apr. 1992, p. 42–51.

Jia, "Efficient Directory Management for Distributed Naming", PROC ICCI '92, Fourth International Conference on Computing and Information, 28–30 May 1992, 118–22.

*Primary Examiner*—Wayne Amsbury
*Attorney, Agent, or Firm*—Erwin J. Basinski

[57] ABSTRACT

In this disclosure an architecture for extensible file systems is described. Also disclosed is an implementation of the architecture. The architecture enables the extension of file system functionality by stacking (or composing) new file systems (layers) on top of existing file systems. The implementor of a new layer has the option of keeping the files exported by the new layer coherent with files of the underlying layer, as well as the option of sharing the same cached memory with the files of the underlying layer. A flexible framework is also disclosed for arranging the file systems' name spaces. Composing of new layers on top of existing ones can be done statically (at compile/configuration time) or dynamically (at boot/run time). In addition, the file system layers can reside in the same address space or in different address spaces, and be implemented on a local computer node or on a remote computer node.

27 Claims, 14 Drawing Sheets

MAJOR SPRING SYSTEM COMPONENTS

SPRING ENVIRONMENT

This figure contains the interface of the cache_object exported by cache managers (the VMM and pagers acting as cache managers). In the following figures the interfAces of objects exported by the pagers are listed. The code below specifies for each parameter a passing mode; a Spring object passed *copy* remains accessible to the caller and callee after the call is made, while a *consumed* object is deleted from the calling domain as a side effect of the call. *Borrow* is an in-out passing mode, while *produce* is an out mode. Due to space consideration some methods, most comments, and type declarations are not shown. Most methods raise exceptions when errors are encountered; the description of the exceptions are also not shown.

```
interface cache_object {

// The size_inbytes argument can be specified as-I
        // to indicate all blocks starting from cache_offset to
        // the end of the cache.
        void flush_back(
                copy offset_t cache_offset,
                copy offset_t size_in_bytes,
                borrow ownership_t vcache_ownership,
                produce data memory_bytes
        );
        void deny_writes(
                // same as parametrs as flush_back( )
        );
        void write_back(
                // same as parametrs as flush_back( )
        );
        void delete_range(
                copy offset_t cache_offset,
                copy offset_t size_inbytes,
                borrow ownership vcache_ownership
        );
        void zero_fill(
                //same parameters as delete_range( )
        );
        void populate(
                copy offset_t cache_offset,
                copy offset_t size_in_bytes,
                copy rights requested_access,
                borrow ownership_t vcache_ownership,
                copy data memory_bytes
        );
        void destroy_cache( );
}; // cache_object interface
```

FIG. 10

```
interface memory—object (
        void bind(
                copy name my_name
                copy rights requested_access,
                copy offset_t mem_obj_offset,
                borrow offset_t lengthinbytes,
                produce rights_object rights_to_cache,
                produce offset_t cache_offset
        );
        void final_bind(
                consume bind_key_object rights_to_bind,
                copy name myname,
                copy rights requested_access,
                copy offset_t mem_obj_offset,
                copy offset_t length_in_bytes
        );
        void get length(
                produce offset_t length_in_bytes);
        void set_length(
                copy offset_t new_length_in_bytes);

}; // memory—object interface interface pager_object { void page_in(
                copy offset_t cache_offset,
                copy offset_t size_in_bytes,
                copy rights requested_access,
                borrow ownership_t vcache_ownership,
                produce data memory_bytes
        );
        void page—out(
                copy offset_t cache_offset,
                copy offset_t sizeinbytes,
                borrow ownership_t vcache_ownership,
                copy data memorybytes
        );
        void write_out(
                // same parameters as page_out( )
        );
        void sync(
                // same parameters as page_out( )
        );
        void zero_fill_range(
                copy offset_t cache_offset,
                copy offset_t sizeinbytes,
                borrow ownership_t vcache_ownership
        );
        void done_with_cache(
                borrow vcache::ownership_t vcache_ownership
        );
        // done_with_pager_object is called by cache
        // manager when it reclaims this cache.
        void done_wit_pager_object(
        );

{; // Pager_object
```

Pager object interface definitions

FIG. 11

```
interface fs_cache_object : cache_object {

// get_acc_mod_time — Return the time of last
    // access and last modification. A time of -1
    // means that the file hasn't been accessed
    // or modified since we were last asked.  In this
    // case the possessor of this object won't ask again
    // until we do another bind of the object.
    void get_acc_mod_time(
            produce long acc_time,
            produce long mod_time
    );
    // get_length — Return the length and make the
    // length read—only.
    offset_t get_length(
            copy boolean delete_it
    );
    // don't_cache_time — Don't cache the time anymore.
    void don't_cache_time(
    );
    // delete_cache — The cached cache is no longer valid.
    void delete_cache(
            produce long acc_time,
            produce long mod_time
    );
}; // fs_cache_object
```

FS cache object interface definition

FIG. 12

```
interface fs_pager_object: pager — object {

// cached_bind is an extended version of
        // the normal memory object bind. The difference
        // is that it also will return cached attributes of
        // the file if possible.
        void cached_bind(
                copy rights requested_access,
                produce ownership_t ownership,
                produce stat_buf stats,
                produce long cache_status,
                copy boolean want_cache_pager,
                produce pager — object cache_pager_obj
        );
        // Return cached stats for the file.
        void cached_stat(
                copy long flags,
                produce stat_buf stats,
                produce long cache_status
        );
        // Set the length of the file object.
        void set_length(copy long length);
        // Release the cached info for this pager object.
        // If any of the length, acctime, or mod_time are
        // != -1, then thses are the cached versions of these
        // attributes.
        void release_cache_info(
                copy long length,
                copy long acc_time
                copy long mod_time
        );
}; // fs_pager_object
```

FS pager object interface definition

FIG. 13

```
interface fs {

// end—user file system interface, e.g. create file,
        // fs_stat.
};  // fs interface stackable_fs : fs, naming — context { void stackon(
                copy stackable_fs underlying_fs
        );

};  // stackable_fs interface stackable_fs_creator { void create(
                produce stackable_fs new_fs
        );

};  // stackable_fs_creator
```

File System Interfaces

FIG. 14

EXTENSIBLE FILE SYSTEM WHICH LAYERS A NEW FILE SYSTEM WITH AN OLD FILE SYSTEM TO PROVIDE COHERENT FILE DATA

This is a continuation of application Ser. No. 08/078,714, filed Jun. 17, 1993, now abandoned.

BACKGROUND OF THE INVENTION

1. Field of the Invention

This invention relates in general to the fields of Computer Operating Systems, Distributed Multi-processor Hardware Systems, Object Oriented Programming, and Virtual Memory Systems. In particular, the invention relates to improved techniques for establishing and efficiently extending file system functionality by structuring file systems as a set of dynamically configurable layers.

2. Background

The role of the operating system in a computer has traditionally been to efficiently manage the hardware resources (the central processing unit ("CPU"), memory and input/output devices). Since files are stored generally on a disk drive or magnetic tape system, this management function has included the role of managing the file system.

Object oriented operating systems, with microkernels which permit client level implementation of file systems, create complexities in memory management which clients have not had to deal with in the past. Moreover, on widely distributed computer networks, files resident on different computers produce unnecessary network communications traffic, without efficient local caching techniques. Nevertheless, micro-kernel systems provide clients with an environment which makes it possible to add functionality to existing file systems, to create new file systems and extend old file systems while minimizing the necessity to write new code to duplicate or significantly modify the existing file systems and existing caching capabilities.

This disclosure describes an extensible file system architecture and a method and apparatus for an extensible file system.

In reviewing the prior art a few definitions are in order. A file is a collection of related information defined by its creator. Commonly, files represent programs (both source and object forms) and data. Data files may be numeric, alphabetic, alphanumeric or binary; may be free-form or formatted rigidly. In general a file is a sequence of bits, bytes, lines, or records whose meaning is defined by the file's creator and user. A file is named and is referred to by its name. In most hierarchical file systems, the name of a file is the path name that describes how to locate the file in the system hierarchy. A path name is a sequence of component names separated by the "/" character. A full path name starts with a "/" character which specifies that a file is found by starting at the file system root and traversing the file tree, following the branches that lead to successive paths. For example, the path name "/usr/src/cmd/two.c" designates the "two.c". A file system then is an application program which knows how to manage a particular set of files, with their particular type of data coding and format and length and other particular characteristics.

In a UNIX® based system, the operating system interacts directly with the hardware providing common services to programs and isolating the software and users/clients from the hardware idiosyncrasies of a particular computer system. (UNIX is a registered trademark of UNIX System Laboratories, Inc.) In UNIX the operating system is commonly called the "system kernel" or just the "kernel", emphasizing its isolation from the user/client programs. The UNIX file system, located within the kernel, organizes the file structures. The file system has traditionally been responsible for managing the file system by: creating and deleting files and directories; providing support for primitive program routines for manipulating files and directories; mapping files onto disk storage; and general protection of the files by limiting access of programs, processes and users to the files. In modern operating systems, this file management function has included the use of a virtual memory subsystem.

Distributed computer systems, some with shared memory, and some with remotely accessible file systems, have led to the creation of "distributed file systems ("DFS")" to support the sharing of files by multiple users when the files are physically dispersed among the various computers of a distributed system. A DFS is a file system whose clients, servers and storage devices are dispersed among the machines of a distributed system. The location and multiplicity of the servers and storage devices is transparent to the client. For additional information on operating systems and file systems, see the text "Operating System Concepts" 3rd edition, by A.Silberschatz, J.Peterson and P.Glavin, 1991 Addison-Wesley Publishing Inc.

Typically, an operating system provides one or two types of file systems that are not modifiable by the user (extensible). In current systems such as UNIX, the file system provides a storage mechanism (in addition to a naming facility) that manages stable storage media and cooperates with the virtual memory system to cache data in memory. There are several architectures that allow for extending the functionality of the file system in one way or another. The Virtual File System (VFS) architecture was originally designed to accommodate multiple file systems within a UNIX kernel. That is, VFS could assist in adding an entire new file system, but it is extremely difficult to replace or enhance separate portions of the file system, as for example, keeping the physical disk management and installing a new directory layer. To add new file system functionality requires either modifying the existing file systems (requiring knowledge of current, multi-thousand line file systems and low level kernel debugging tools) or adding a new file system (again requiring the writing usually of multiple lines of code much of which duplicates existing file system support code).

Recently, a proposal was made to evolve VFS to support the implementation of new file systems in terms of preexisting ones. Other systems such as the Apollo extensible IO system and the FICUS system allow for extending the file system in a limited manner. Such systems demonstrate along with other systems the need for extending the file system. However, the goals of these systems are necessarily limited. For additional information on FICUS and recent attempts to add functionality using a stackable filing layer framework see the following two papers: "A Layered Approach to File System Development" by John S. Heidemann and Gerald J. Popek, Department of Computer Science, University of California, Los Angeles, Technical Report CSD-910007, March 1991; and "File System Development with Stackable Layers", Draft report by John S. Heidemann and Gerald J. Popek, Department of Computer Science, University of California, Los Angeles, Mar. 28, 1992.

With the advent of micro-kernel operating systems, file systems are being implemented outside of the kernel in user level servers. These new file systems must solve a new set of problems to provide efficient performance. In addition however, the micro-kernel architecture provides the ability to add functionality to existing file systems to handle the necessary security or encryption requirements, as well as add new caching and coherency capabilities with minimal user or operating system disruption. Examples of new functionality that may need to be added to existing file systems include data or file compression, replication, encryption, distribution, and extended file attributes.

There are four broad requirements that are necessary for a flexible extensible file system architecture:

1. Leveraging existing file systems. One should be able to easily leverage existing file systems when introducing new file system functionality. This should be achievable without affecting the clients of the existing file systems.

2. Caching. For efficient performance reasons, the extensible file system architecture must define means for caching file data and attributes.

3. Coherency. Due to caching, distribution, and to multiple clients accessing the same data from different points of view, the architecture must define a framework for keeping file data and attributes coherent. However, the coherency policies should be left to the implementation of the file systems. Coherentin this case means that the data and attributes in all user's address spaces must be updated when any one user updates a field in their copy of the data or attributes.

4. Dynamic addition of functionality. It should be possible to add new functionality to a running system, and to dynamically extend the functionality of files. In addition, new file systems should be able to reside in the kernel or in user mode.

SUMMARY OF THE INVENTION

This disclosure describes an architecture for extensible file systems and an apparatus and method for an extensible file system. The architecture enables the extension of file system functionality by stacking (or composing) new file systems (layers) on top of existing file systems. The implementor of a new file system layer has the option of keeping the files made available by the new layer coherent with files of the underlying layer, as well as the option of sharing the same cached memory with the files of the underlying layer. A flexible framework is also provided for arranging the file systems' name spaces. Composing of new layers on top of existing ones can be done statically (at compile/configuration time) or dynamically (at boot/run time). In addition, the file system layers can reside in the same address space or in different address spaces, and be implemented on a local computer node or on a remote computer node.

A method is disclosed for use in a computer system having a naming service for determining the location of an existing file, for connecting a new file system to the naming service so that a naming connection is made between the existing file system and the new file system, and for connecting the new file system to the existing file system by means of a data movement facility which has the ability to provide coherent data to the new file system.

An extensible file system in a distributed computer system is also disclosed which comprises an identification device for locating an existing file system using a naming service, a file system creation mechanism for creating an instance of a new file system which can be connected to the existing file system, and connected to the naming service so that a client can access files in either of the file systems without knowledge of which system the files are in, and a data movement facility which can provide coherent data from a layer containing the existing file system to the layer containing the new file system.

DESCRIPTION OF THE DRAWINGS

The objects, features and advantages of the system of the present invention will be apparent from the following description in which:

FIG. 10 is a code description of the cache object interface definition in the preferred embodiment.

FIG. 11 is a code description of the pager object and memory object interface definitions in the preferred embodiment.

FIG. 12 is a code description of the fs_cache object interface definition in the preferred embodiment.

FIG. 13 is a code description of the fs_pager object interface definitions in the preferred embodiment.

FIG. 14 is a code description of the fs and stackable_fs file system interface definitions in the preferred embodiment.

NOTATIONS AND NOMENCLATURE

Figure 1:
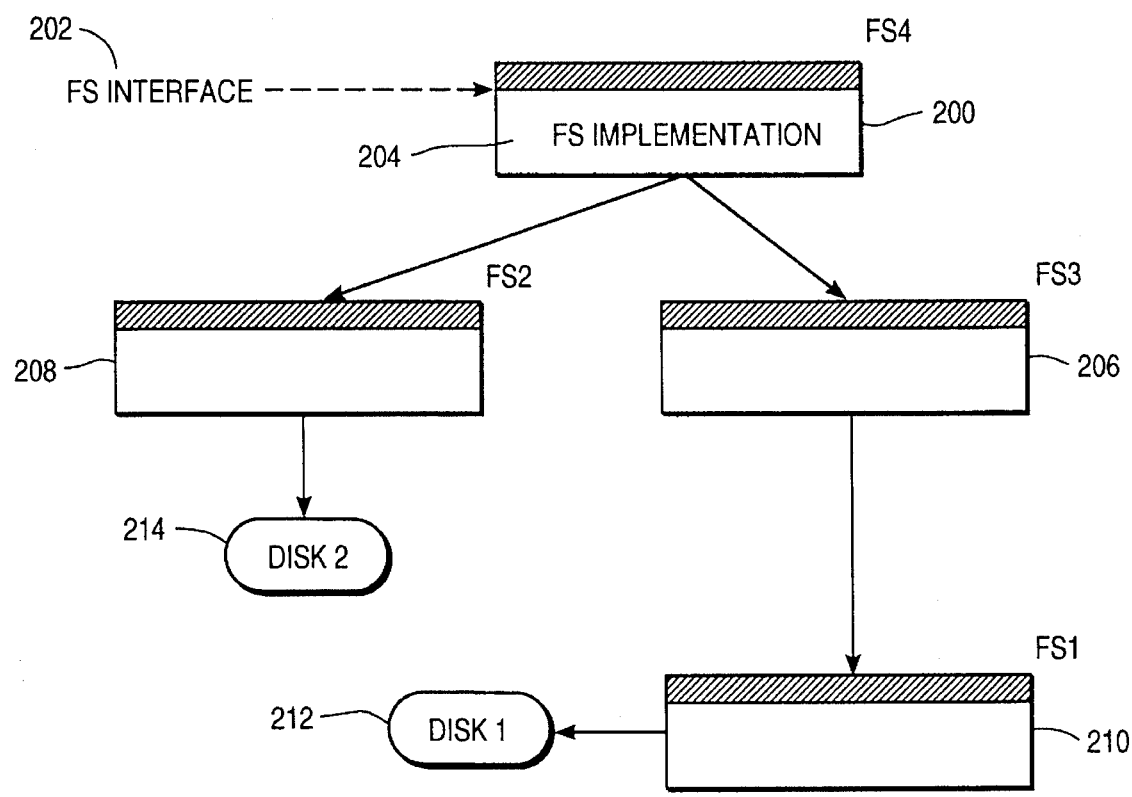
FIG. 1 is a block diagram illustrative of the file stacking architecture of the present invention.

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices. In all cases there should be bourne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

In this disclosure an architecture for extensible file systems is described. Also disclosed is an implementation of the architecture. The architecture enables the extension of file system functionality by stacking (or composing) new file systems (layers) on top of existing file systems. The implementor of a new layer has the option of keeping the ties exported by the new layer coherent with files of the underlying layer, as well as the option of sharing the same cached memory with the files of the underlying layer. A flexible framework is also disclosed for arranging the file systems' name spaces. Composing of new layers on top of existing ones can be done statically (at compile/configuration time) or dynamically (at boot/run time). In addition, the file system layers can reside in the same address space or in different address spaces, and be implemented on a local computer node or on a remote computer node.

In the following description, for purposes of explanation, specific data and configurations are set forth in order to provide a thorough understanding of the present invention. The preferred embodiment described herein is implemented as a portion of the SPRING Object-Oriented Operating System created by Sun Microsystems®, Inc. (Sun Microsystems is a registered trademark of Sun Microsystems, Inc.) SPRING is described in some detail below in the discussion of a preferred embodiment. However, it will be apparent to one skilled in the art that the present invention may be practiced without the specific details and may be implemented in various computer systems and in various configurations, or makes or models of tightly-coupled processors or in various configurations of loosely-coupled multiprocessor systems.

File System Stacking Architecture

This file system stacking architecture enables new file systems to be added that extend the functionality of and build on existing file system implementations. This is achieved by adding new file system layers to the system. It is important to note that as long as the interface of the new layer conforms to the interface of a file system, clients will view the new layer as a file system, regardless of how it is implemented. The implementation decides how the new layer utilizes the underlying file systems which in turn also must conform to the file system interface. An interface is a description of an object (for example, file system, cache, pager, etc.) and its methods (operations) that is generally specified in an interface definition language. Administrative decisions are used to choose which file systems to stack on top of other file systems (or individual files), and to arrange the name space appropriately.

There need not be a one-to-one correspondence between the files exported by a given layer and its underlying layers. A file system may even export files that do not actually exist. Again, the implementation of a given file system makes such decisions. To export a file means to make it accessible to clients. This is normally done by binding the file's name in a name space.

FIG. 1 illustrates an example configuration of stacked file systems. Referring to FIG. 1, a typical file system layer 200 comprises the interface of the file system 202 and the program code which implements the file system 204. Layer fs4 200 is connected to layer fs2 208 and to layer fs3 206, which itself is connected to layer fs1 210. Layer fs2 208 is shown connected to a disk drive 214 and layer fs1 210 is connected to a different disk drive 212. In FIG. 1, each box represents a layer that exports a file system interface. Exporting a "file system interface" is similar to exporting a file. When a file system object is exported, it is made accessible to clients, usually by binding its name in the name space. It should be noted that in the preferred embodiment of the extensible file system architecture, (as explained in more detail below), the file system object is also a "naming context" which means that accessing it allows access to a name space that contains files that are exported by this file system. At the bottom of the stack are base file systems fs1 210 and fs2 208 that build directly on top of storage devices (e.g. disk drives, etc.). The implementation of fs3 206 uses one underlying file system, while the implementation of fs4 200 uses two underlying file systems to implement its function (e.g. fs3 206 is a compression file system and fs4 200 is a mirroring file system). The choice of which file systems to use as the underlying file systems for fs3 206 and fs4 200 is an administrative decision. It is also an administrative decision whether (and to whom) to expose the files exported by the various file systems. Note that the decision of which disk drives to use for the base file systems fs1 210 and fs2 208 is similar to the current practice of mounting disk partitions.

There are two major components to the extensible file system architecture:

1. a Data Movement Facility comprising two sub-components:

a). a stackable pager interface for caching data and keeping it coherent, and b) a stackable attribute interface for caching file attributes and keeping them coherent;

2. and a stackable file system interface that is used with a flexible naming architecture to compose file systems and to arrange the file name space.

The Data Movement Facility
Stackable Pager Interface

A Data Movement Facility must be able to provide a file system layer the ability to both page data from and to a lower layer as well as cache data for a higher layer. It is also essential that the Data Movement Facility provide the ability to keep both file data and attribute data coherent. A preferred embodiment of such a Data Movement Facility using the SPRING cache and pager objects, is described in more detail below. In a micro-kernel system in general, anybody can implement cache objects. A Virtual Memory Manager (VMM) is one such cache manager; pagers can also act as cache managers to other pagers. Therefore, a pager may have its data cached at several cache managers, some of which may be virtual memory managers. As far as the pager is concerned, it uses the same algorithm to maintain the coherency of its data regardless of whether a particular cache manager is a VMM or not.

Figure 2:
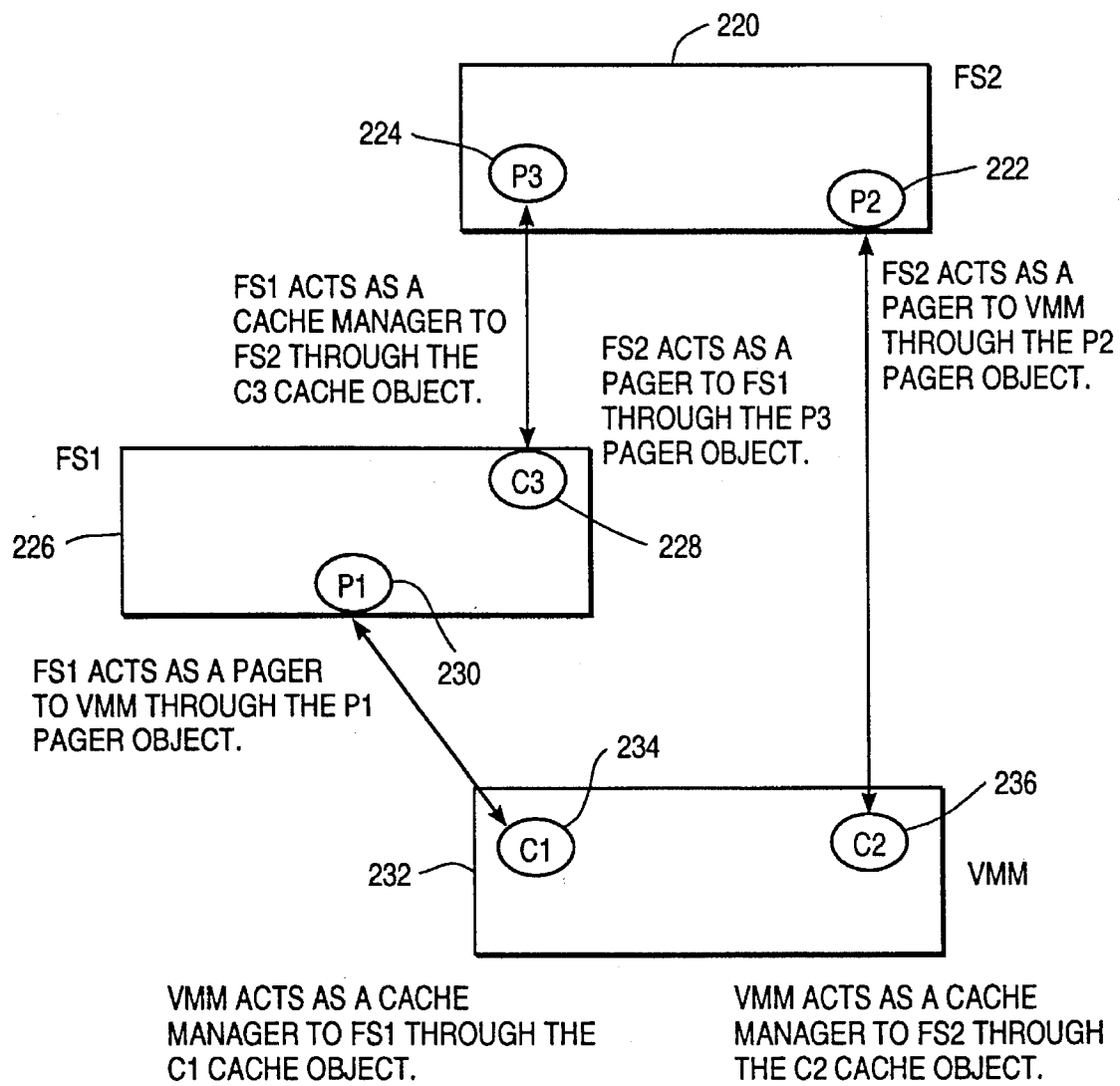
FIG. 2 is a block diagram illustrative of the use of file system layers as pagers and cache managers in the file stacking architecture of the present invention.

Referring to FIG. 2, an exemplary configuration of file system layers as pagers and cache managers making use of the data movement facility is shown. File system layer fs2 220 contains pagers P2 222 and P3 224. Pager P2 222 connects to cache C2 236 thus connecting layer fs2 220 to layer VMM 232 (which in this case is a Virtual Memory Manager). Layer fs2 220 is also connected to layer fs1 226 by means of the connection between pager P3 224 (in fs2 220) and cache C3 228 (in fs1 226). Finally layer fs1 226 is also connected to layer VMM 232 by means of the connection between pager P1 230 and cache C1 234. FIG. 2 shows how a file server may act as a pager and a cache manager at the same time. In particular, in this figure, fs1 226 acts as a pager to the VMM 232 through the pager object P1 230, and fs1 226 acts as a cache manager to fs2 220 through the cache object C3 228.

There are two possible design decisions that the implementor of a file system layer must make regarding data caching:

Whether to keep the layer's files coherent with the files of the underlying file system. A file system can maintain coherency with the underlying files by acting as a cache manager for those files.

Whether to use the same cached pages for the layer's files and for the files of the underlying file system. A file system can use the same cached memory by forwarding local binds to the underlying file system which has the effect of using the same cache as the one used for the underlying file. A local bind is a bind request issued by a cache manager on the same computer node as the file system layer receiving the request. Thus this decision amounts to a decision to keep or put the layer on the same machine as the underlying file system layer or not. The Data Movement Facility must provide the capability to do either. The bind request itself, as used in the preferred embodiment, is explained below in the section on "SPRING's Data Movement Facility."

Stackable File Attributes Interface

The previous section described how we can use the cache and pager object interfaces as the building blocks for accessing and caching data, and keeping it coherent. The cache and pager object interfaces alone, however, are insufficient for stacking file systems. In addition to data, files contain attributes such as access and modified times and file length. Other attributes that may be associated with files include access control fists and generalized attribute lists.

One approach to handling file attributes would be to add more operations to the cache and pager object interfaces. Such an approach suffers from two problems. First, it is not possible to decide on all operations that may be needed by possible future file system extensions. Second, adding file system-specific operations to a data movement interface complicates the implementation of non-file system clients of that interface.

Instead of burdening the cache and pager object interfaces with file-specific operations, a preferred approach is to subclass the cache and pager interfaces into fs_cache and fs_pager interfaces, respectively. These two interfaces add some file attribute operations that provide a good starting point for handling file systems (basically, operations for caching and keeping coherent the access and modified times and file length). Note that the fs_cache and fs_pager interfaces can be subclassed further to add more file system functionality. A particular file system implementation may attempt to narrow these objects to other subtypes, or further subclass these interfaces to add more operations. Those skilled in the an will recognize that there are other ways to develop and use file-specific operations to the disclosed extensible file system architecture.

An Implementation in the Preferred Embodiment

Before describing a preferred embodiment of the extensible file system, it is necessary to describe the environment and facilities of the SPRING Object Oriented operating system.

A SPRING object is an abstraction that contains state and provides a set of methods to manipulate that state. The description of the object and its methods is an interface that is specified in the interface definition language. The interface is a strongly-typed contract between the implementor (server) and the client of the object.

A SPRING domain is an address space with a collection of threads. A given domain may act as the server of some objects and the clients of other objects. The implementor and the client can be in the same domain or in a different domain.

Since SPRING is object-oriented it supports the notion of interface inheritance. Spring supports both notions of single and multiple interface inheritance. An interface that accepts an object of type "foo" will also accept an instance of a subclass of "foo". For example, the address_space object has a method that takes a memory_object and maps it in the address space. The same method will also accept file and frame_buffer objects as long as they inherit from the memory_object interface.

The SPRING kernel supports basic cross domain invocations and threads, low-level machine-dependent handling, as well as basic virtual memory support for memory mapping and physical memory management A SPRING kernel does not know about other SPRING kernels—all remote invocations are handled by a network proxy server. In addition, the virtual memory system depends on external pagers to handle storage and network coherency.

Figure 3:
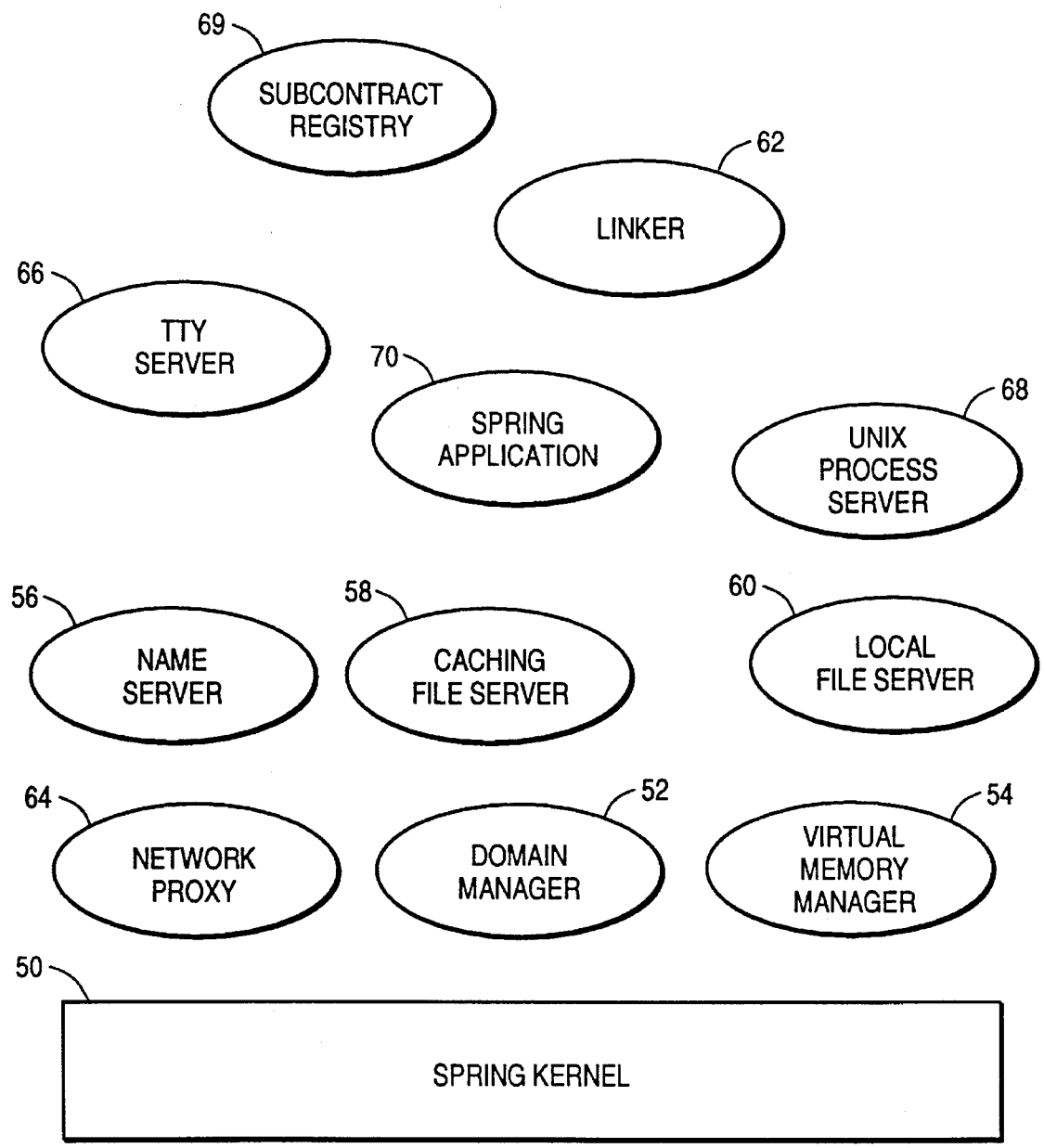
FIG. 3 is a block diagram illustrating the major system components on a node in the SPRING system used in the preferred embodiment.

Referring to FIG. 3, a typical SPRING node runs several servers in addition to the kernel 50. These include the domain manager 52, the virtual memory manager ("VMM") 54; a name server 56; the CFS file server 58; a local file server 60; a linker domain 62 that is responsible for managing and caching dynamically linked libraries; a network proxy 64 that handles remote invocations; and a tty server 66 that provides basic terminal handling as well as frame-buffer and mouse support. Other major SPRING system components which might be present are a UNIX process server 68, a subcontract registry 69 and any number of SPRING applications 70.

SPRING currently includes a distributed operating system and a support framework for distributed applications.

The Interface Definition Language

The unifying principle of SPRING is that all the key interfaces are defined in a standard interface definition language. This language is object-oriented and includes support for multiple inheritance. It is purely concerned with interface properties and does not provide any implementation information.

From the interface definition language it is possible to generate language-specific stubs. These stubs provide a language-specific mapping to the SPRING interfaces. For example, in our main implementation language, C++, Spring objects are represented by C++ objects. When a method on a stub object is invoked, it will either perform a local call within the current address space or forward the call to another address space, which may be on a different machine.

SPRING places an unusually strong emphasis on the separation of interfaces from implementations. Clients are constrained to operate on what they perceive as local objects and the system imposes no constraints on how these objects are implemented. For example, sometimes the underlying state of an object might be in the same address space as the client, sometimes it might be in another address space, sometimes it might be in memory that is shared between the client and the server, or sometimes it might dynamically migrate between several of these states.

The Spring Object Model

SPRING has a slightly different way of viewing objects from other distributed object oriented systems and it is necessary to clarify this before discussing the details of subcontract.

Figure 4A:
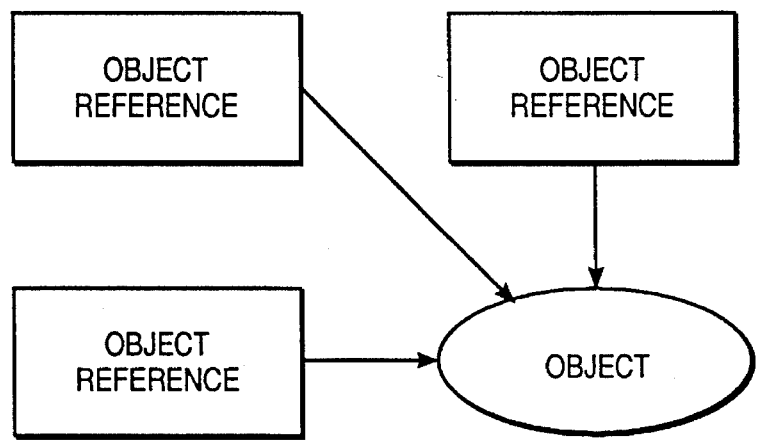
FIGS. 4a & 4b illustrate the SPRING use of the term "object".

Most distributed systems present a model wherein objects reside at server machines and client machines possess object handles that point to the object at the server. (See FIG. 4a.) So clients pass around object handles rather than objects.

Figure 4B:
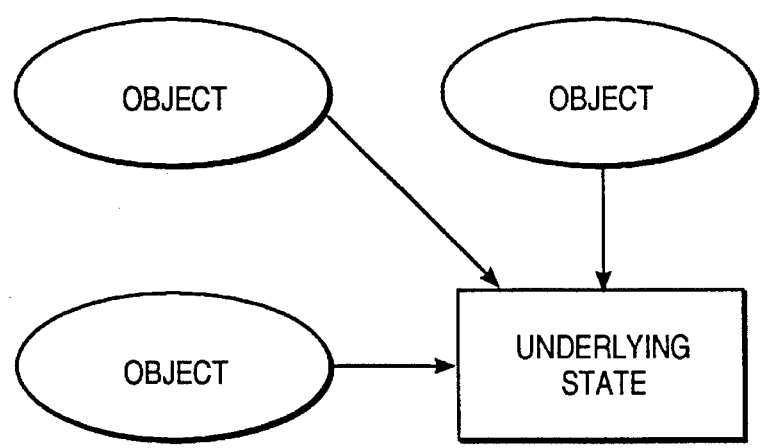

SPRING presents a model wherein clients are operating directly on objects, not on object handles. (See FIG. 4b.) Some of these objects happen to keep all their interesting state at some remote site, so that their local state merely consists of a handle to this remote state. An object can only exist in one place at a time, so if an object is transmitted to someone else then the transmitter ceases to have the object. However, the object can also be copied before transmitting it, which might be implemented such that there are now two distinct objects pointing to the same remote state.

So whereas in some object oriented systems, one might talk of several clients having object handles that reference some remote object, in SPRING one would talk about several clients having objects that reference the same remote state.

For most server-based objects this distinction is mainly one of terminology. However SPRING also supports objects which are not server based, or where the state of the object is split between the client and the server. In these cases it is much more convenient to regard the client as possessing the true object, rather than merely possessing a pointer.

At the present time, the SPRING operating system is based around a minimal kernel, which provides basic object-oriented interprocess communication and memory management. Functionality such as naming, paging, file systems, etc. are all provided as user-mode services on top of the basic kernel. The system is inherently distributed and a number of caching techniques are used to boost network performance for key functions. The system also supports enough UNIX emulation to support standard utilities such as make, vi, csh, the X window system, etc.

SPRING's Data Movement Facility

In SPRING a per-node virtual memory manager (VMM) is responsible for handling mapping, sharing, and caching of local memory. The VMM depends on external pagers for accessing backing store and maintaining inter-machine coherency.

Most clients of the virtual memory system only deal with address space and memory objects. An address space object represents the virtual address space of a Spring domain while a memory object is an abstraction of store (memory) that can be mapped into address spaces. An example of a memory object is a file object (the file interface in Spring inherits from the memory object interface). Address space objects are implemented by the VMM.

A memory object has operations to set and query the length, and operations to bind to the object (see below). Them are no page-in/out or mad/write operations on memory objects (which is in contrast to systems such as MACH developed by Carnegie Mellon University). The SPRING file interface provides file read and write operations (but not page-in and page-out operations). Separating the memory abstraction from the interface that provides the paging operations is a feature of the SPRING virtual memory system that was very useful in implementing the SPRING file system. This separation enables the implementor of the memory object to be different from the implementor of the pager object which provides the contents of the memory object.

Binding a Memory Object to a Cache Object

When a VMM is asked to map a memory object into an address space, the VMM must be able to obtain the actual memory represented by the memory object, since the memory object itself does not provide operations for obtaining this data. Therefore, the VMM contacts the pager that implements the memory object by invoking the bind operation on the memory object. The objective of the bind operation is to point the VMM to a local data cache that provides the contents of the memory object.

During the bind operation the VMM and the pager exchange two objects: a pager object and a cache object. The pager object provides operations to page-in and out memory blocks and is used by the VMM to populate a local cache. The cache object is implemented by the VMM and is used by the pager to affect the state of the cache. The operations of the pager and cache objects, respectively, are as follows:

| Pager Object Operation | Description |
| --- | --- |
| page_in | = Request data be brought into the cache. |
| page_out | = Write data to pager and remove data from cache. |
| write_out | = Write data to pager and retain data in read only mode. |
| sync | = Write data to pager and retain data in same mode. |

| Cache Object Operation | Description |
| --- | --- |
| flush_back | Remove data from the cache and send modified blocks to the pager. |
| deny_writes | Downgrade read-write blocks to read-only and return modified blocks to the pager. |
| write_back | Return modified blocks to the pager. Data is retained in the cache in the same mode as before the call. |

| | |
|---|---|
| delete_range | Remove data from the cache-no data is returned. |
| zero_fill | Indicate to the VMM that a particular range of cache is zero-filled. The data blocks in the range are held by the VMM in read-write mode. |
| populate | Introduce data blocks into the cache. |

A given pager object—cache object pair constitutes a two-way communication channel between a pager and a VMM. Typically, there are many such channels between a given pager domain and a VMM.

As far as the VMM is concerned, each memory object is unique—the VMM relies on the memory object's pager to point it to a data cache from which the VMM obtains the contents of the memory object. This extra level of indirection allows different memory objects that share the same pages (but perhaps encapsulate different access rights) to share the same cache at the VMM instead of flushing the same pages back and forth between two separate caches at the VMM.

Maintaining Data Coherency

The task of maintaining data coherency between different VMMs that are caching a memory object is the responsibility of the pager for the memory object. The coherency protocol is not specified by the architecture. Pagers are free to implement whatever coherency protocol they wish. The cache and pager object interfaces provide basic building blocks for constructing the coherency protocol. FIGS. 10, 11 12 13, and 14 contain code descriptions in Interface Definition Language form of the cache object, pager object and memory object, fs_cache object and fs_pager objects, and fs and stackable_fs objects respectively, as they are used in the preferred embodiment of the extensible file system implementation for file data and attribute data caching and coherency.

(The exact details of how the mapping and bind operations indicated above are performed, are described in the co-pending application Ser. No. 07/904,226 filed by Yousef A. Khalidi and Michael N. Nelson for A Method and Apparatus for a Secure Protocol for Virtual Memory Managers that use Memory Objects which is hereby incorporated herein by reference.)

Extensible File Systems in Spring

Figure 5:
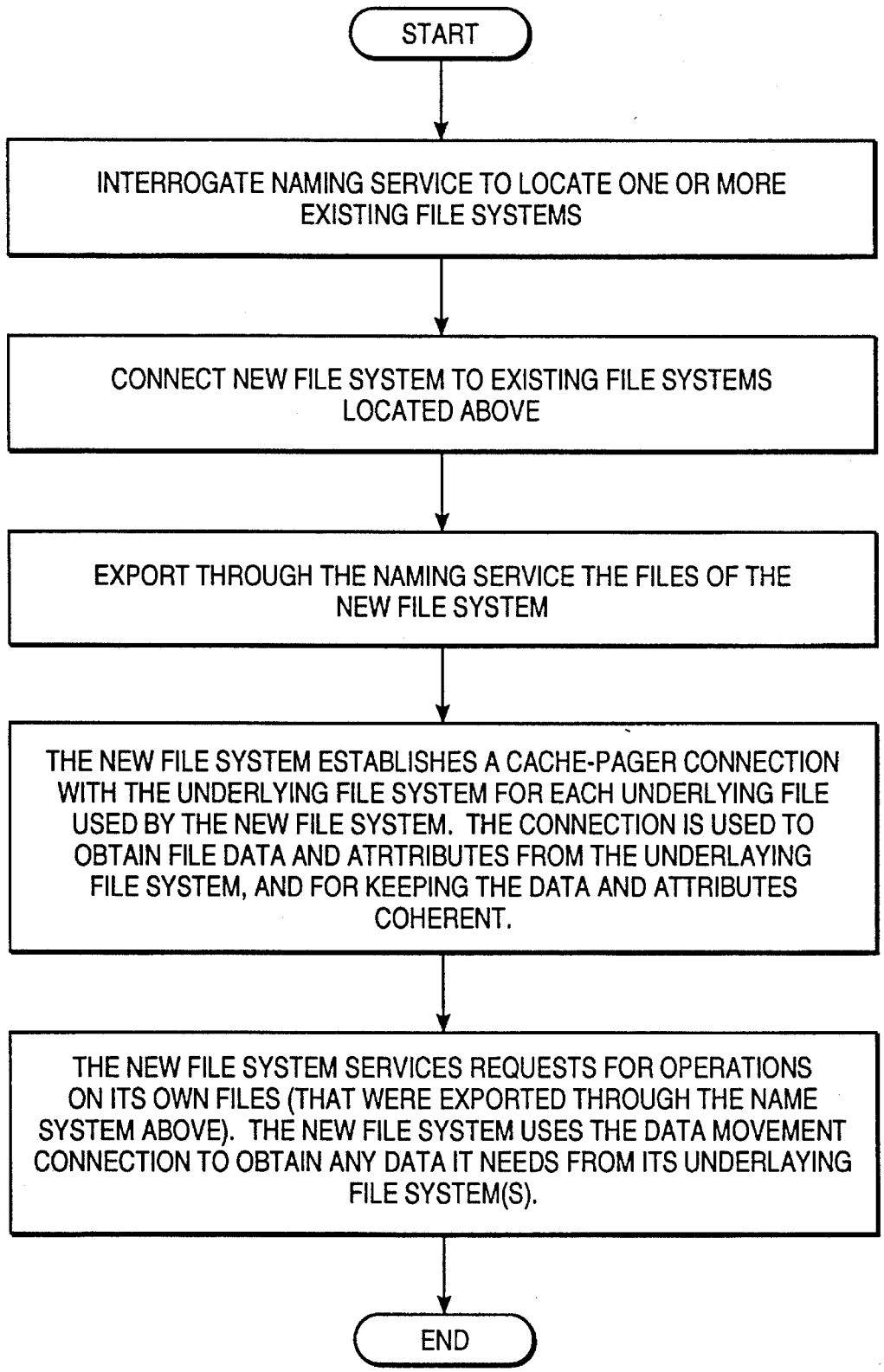
FIG. 5 is a block diagram of the general procedure to create an extensible file system layer.

Within the context of the SPRING Object Oriented system definitions outlined above, the implementation of the preferred embodiment of the Extensible File System of the present invention is now described. FIG. 5 is a block diagram of the general steps used in creating a new file system layer using the extensible file system architecture disclosed herein. This procedure is now explained in more detail.

Figure 6:
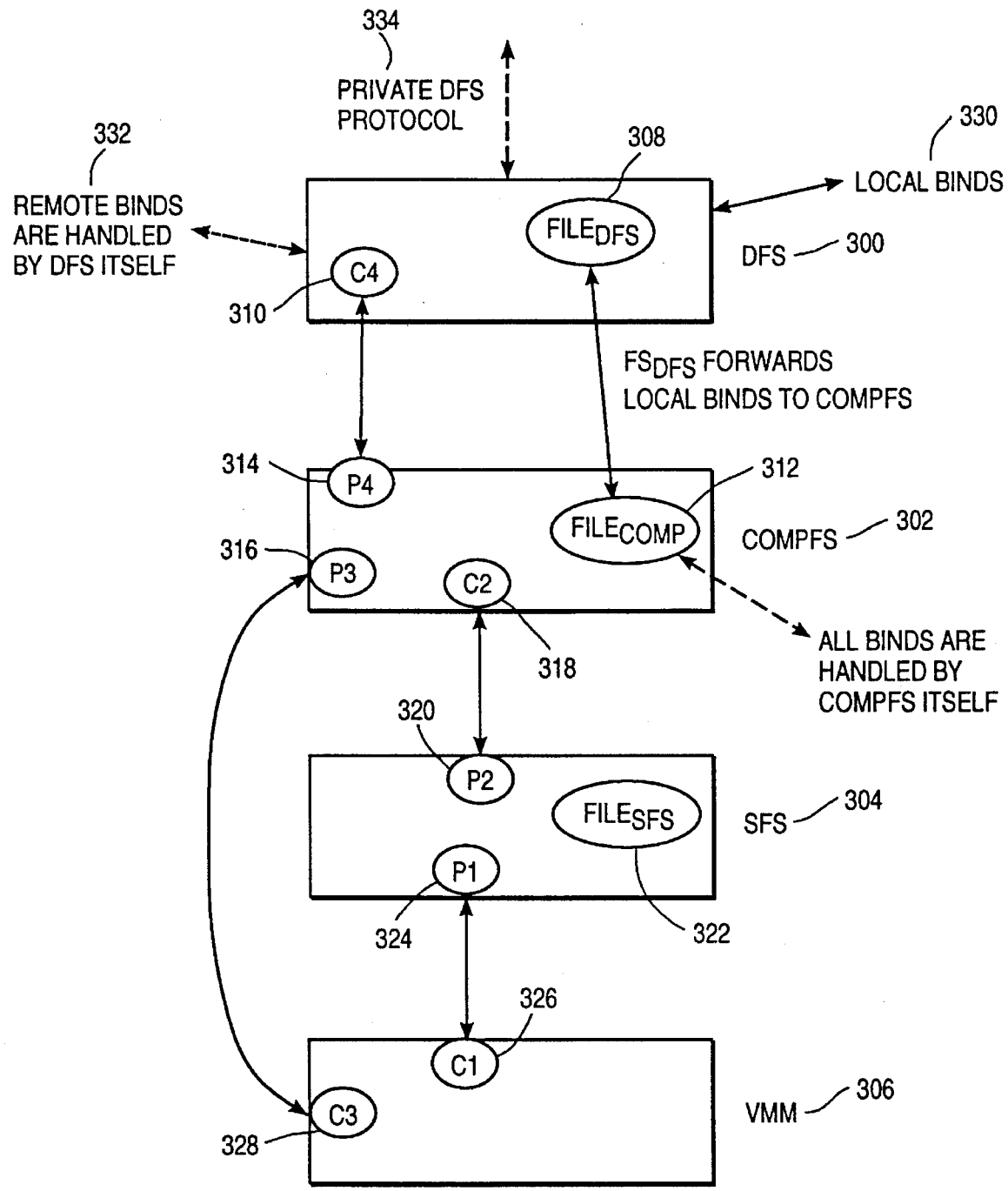
FIG. 6 is a diagram of the exemplary extensible file system instance in the preferred embodiment.

Referring to FIG. 6 an exemplary stacked extensible file system is depicted for the purposes of the following descriptions. A Distributed File System (DFS) layer 300 is stacked upon a Compression File System (COMPFS) layer 302, which is itself stacked upon a Storage File System (SFS) layer 304 which in turn is stacked on the Virtual Memory Manager (VMM) layer 306. The COMPFS layer 302 is also directly connected to the VMM layer 306 via the pager object P3 316 connection to cache object C3 328. File system objects "file$_{DFS}$" 308, "file$_{COMP}$" 312 and "file$_{SFS}$" 322 are shown in their respective layers. And additional cache object-pager object connections between the four layers are shown as follows: cache object C1 326 and pager object P1 324 connect the VMM 306 to the SFS layer 304; cache object C2 318 and pager object P2 320 connect the COMPFS layer 302 to the SFS layer 304; and cache object C4 310 and pager object P4 314 connect the DFS layer 300 to the COMPFS layer 302.

Configuring Extensible File System Stacks and Name Spaces

How to configure file system stacks such as that shown in FIG. 6, and how to configure the resulting file name space in the preferred embodiment are now described.

A mechanism is needed to construct file systems layers. In the examples presented so far, a layer is really an instance of a file system, since there can be other layers containing instances of the same file system stacked on other file systems. In the preferred embodiment an interface stackable_fs_creator is defined that is used to create instances of stackable file systems. This interface provides one operation, create, that returns instances of file systems of type stackable_fs. The stackable_fs interface inherits from the fs and naming_context interfaces. That is:

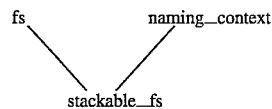

At boot time or during run-time, the file system creator for each file system type (e.g. DFS and COMPFS) is created. When a file system creator is started, it registers itself in a well-known name space, e.g./fs_creators/dfs_creator.

The method to configure a new file system is:

1. A file system creator object is looked up from the well known name space using a normal naming resolve operation (e.g. "dfs_creator" is looked up in/fs_creators, returning the object dfs_creator_obj which is of type stackable_fs_creator).

2. The file system creator object returned by step 1 is used to create an instance of the file system, e.g. stackable_rs dfs=dfs_creator_obj→create( );

3. The dfs instance is given an object of type stackable_fs as the underlying file system, e.g. dfs→stackon(fs$_2$);

Note that since fs$_2$ is of type stackable_fs it is also a naming_context. The stack_on operation can be called more than once to stack on more than one underlying file system—the maximum number of file systems a particular layer may be stacked on is implementation dependent.

4. The new file system instance is bound somewhere in the name space to expose its files to user programs, e.g. some_name_server→bind(cxt, dfs);

Note that dfs is also a naming—context.

If it is desired to configure a file system such that the layers are implemented by the same domain, then the creator objects used to create the layers must be implemented by the same domain. In order to allow administrators that are configuring file systems to determine if creator objects are implemented by the same domain, a particular domain that implements several layers constructs a context that contains all of its creator objects. For example, a domain D1 that implements both DFS and COMPFS layers will register its creator objects under the names/fs_creators/D1/dis_creator and /fs_creators/D1/compfs_creator.

Figure 7:
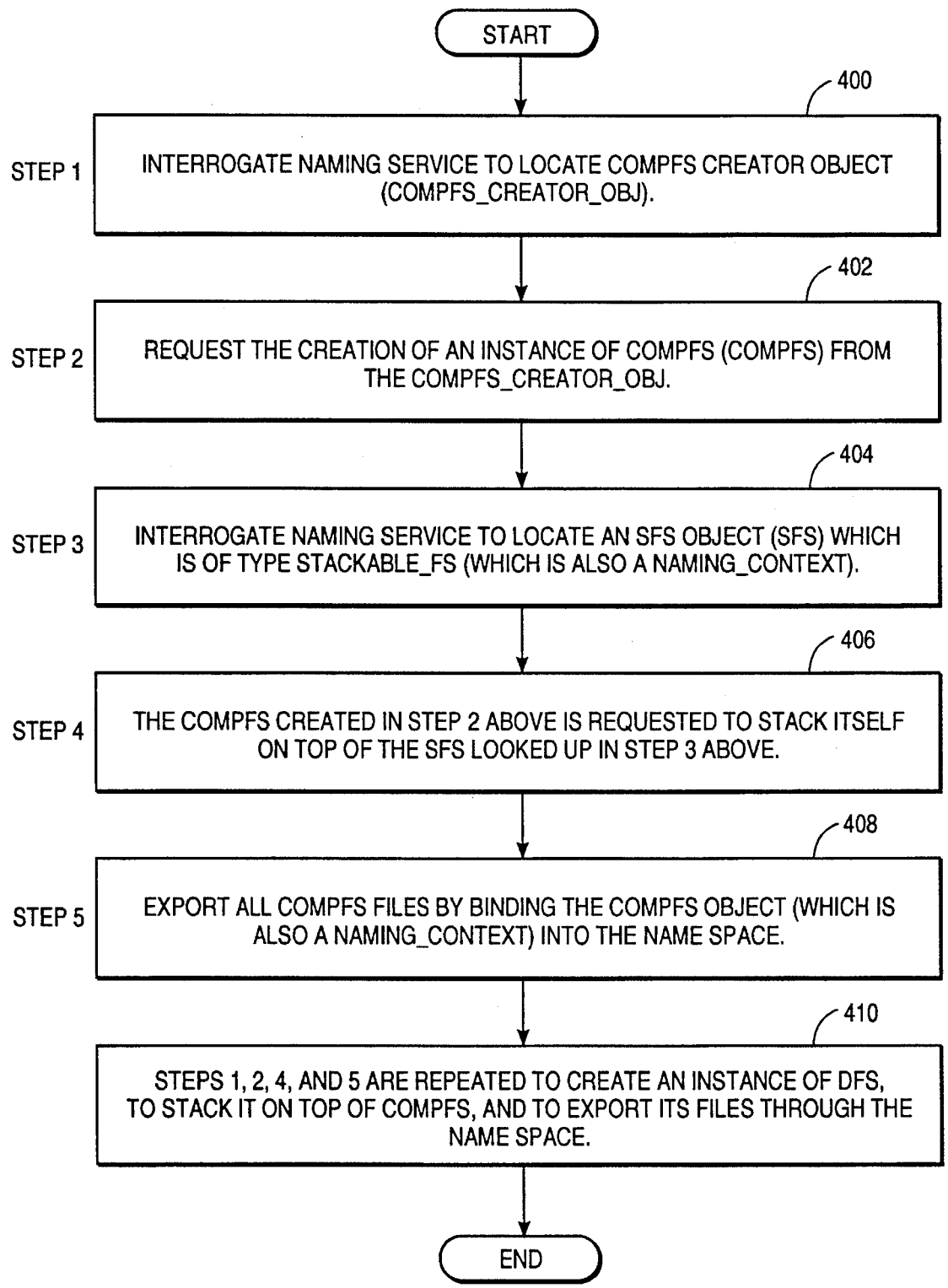
FIG. 7 is a block diagram illustrative of an exemplary creation of an extensible file system instance in the preferred embodiment.

Referring now to FIG. 7 the steps used in creating the extensible file system stack shown in FIG. 6 are described. In this setup, DFS is stacked on COMPFS which is in turn stacked on SFS. The stack is created using the following steps:

1. The naming service (e.g./fs_creators) is interrogated to locate COMPFS creator object (compfs_creator_obj) 400.

2. The compfs_creator_obj is requested to create an instance of COMPFS(compfs) (for example: stackable_fs compfs=compfs_creator_obj→create( )) 402.

3. An SFS object (sfs) which is of type stackable_fs (which is also a naming_context) is located in a naming service (e.g. looked up from/fs/SFS0a) 404.

4. The compfs created in step 2 is requested to stack itself on the top of sfs looked up in step 3 (for example: compfs→stackon(sfs)) 406.

5. A decision is made whether to export SFS, COMPFS, and DFS files (and to whom). A file system is exported by binding its stackable_fs object in a context somewhere. For example, all compfs files would be exported by binding the "compfs object" (which is also a naming_context) into the name space. 408.

Steps 1, 2, 4 and 5 are repeated to create an instance of DFS, to stack it on top of compfs, and to export its files through the name space. For example, for DFS:

```
stackable_fs dfs=dfs_creator_obj→create( )

dfs→stackon(compfs)
```

Figure 8:
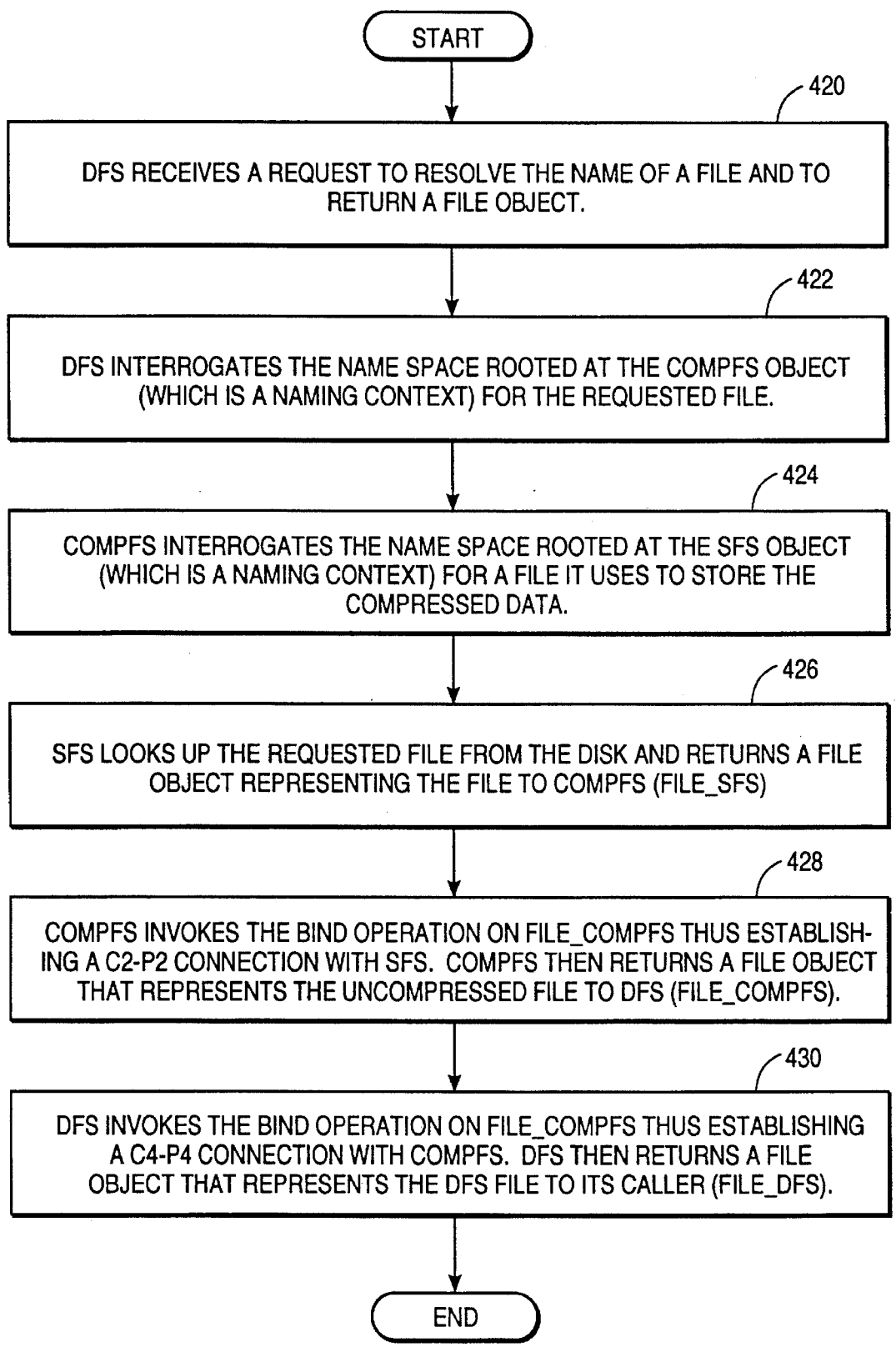
FIG. 8 is a block diagram illustrative of an exemplary set of steps taken to process a name look-up in the preferred embodiment.

Now suppose a name lookup arrives through the private DFS protocol (334 in FIG. 6). Referring now to FIG. 8 the steps taken to process a name lookup on a file implemented by the DFS are as follows:

DFS receives a request to resolve the name of a file and to return a file object 420.

DFS interrogates the name space rooted at the sfs object (which is a naming context) for the requested file 422.

COMPFS in turn resolves the file in SFS by interrogating the name space rooted in at the sfs object (which is also a naming_context) for a file it uses to store the compressed data 424.

SFS looks up the requested file from the disk and returns a file object (file_sfs) representing the desired file to COMPFS 426.

COMPFS invokes the bind operation on file_sfs to set up a C2-P2 connection with SFS. COMPFS then returns a file object that represents the uncompressed file to DFS (file_compfs) 428.

DFS invokes the bind operation on file_compfs thus establishing a C4-P4 connection with COMPFS. DFS then returns a file object that represents the DFS file to its caller (file_dfs) 430.

Figure 9:
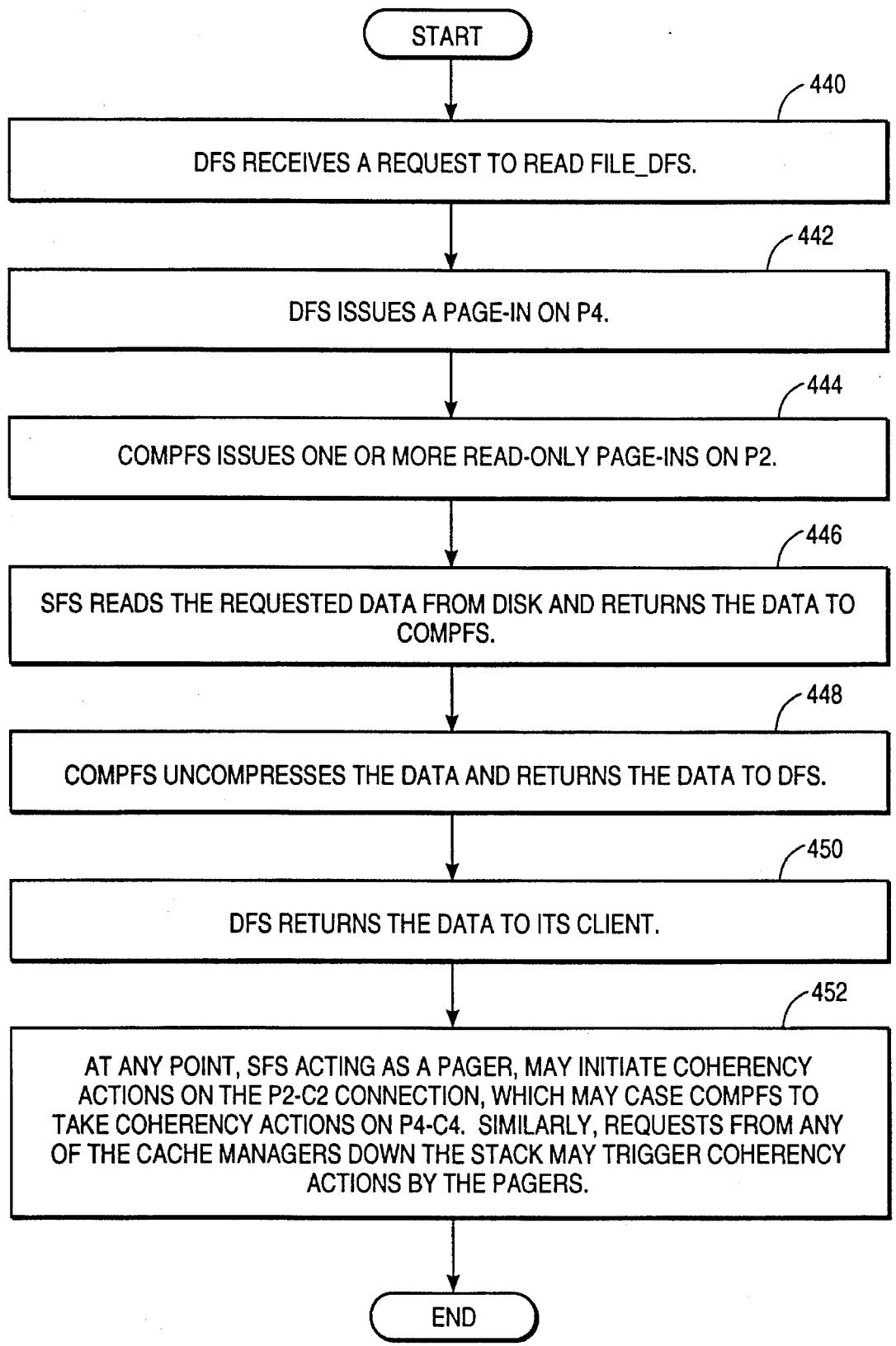
FIG. 9 is a block diagram illustrative of an exemplary set of steps taken to process a read operation on an extensible file system instance in the preferred embodiment.

Referring now to FIG. 9, the steps taken to process a read on a DFS file are illustrated. A remote read request arriving through the private DFS protocol results in:

DFS receiving a request to read file_dfs 440.

DFS issues a page-in on P4 442.

COMPFS issues one or more read-only page-ins on P2 444.

SFS reads the requested data from disk and returns the data to COMPFS 446.

COMPFS uncompresses the data and returns it to DFS 448.

DFS sends the data to its DFS client through the private DFS protocol 450.

Note that at any point, SFS acting as a pager, may initiate coherency actions on the P2-C2 (in FIG. 6) connection, which may cause COMPFS to take coherency actions on P4-C4. Similarly, requests from any of the cache managers down the stack (C1 326, C3 328, C2 318 or C4 310) may trigger coherency by the pagers.

Note also that at any point the underlying data of file_dfs (308 in FIG. 6) may be accessed through file_comp 312 or (uncompressed) through file_sfs 322. All such accesses will be coherent with each other and with remote DFS clients.

While the invention has been described in terms of a preferred embodiment in a specific context and operating system environment, those skilled in the art will recognize that the invention can be practiced, with modification, in other contexts, whether they be object oriented or not, and in different operating systems within the spirit and scope of the appended claims.

What is claimed is:

1. In a computer system having a naming service, a computer implemented method for associating a new file system with an existing file system, said method comprising the steps of:

determining the location of said existing file system located in a first layer, by interrogating said naming service;

connecting a new file system to said naming service, said new file system located in a second layer, said first layer and said second layer being program code sections which may reside in different computers and such that files in said existing file system can be accessed through said new file system; and connecting said new file system to said existing file system by a data movement facility wherein said data movement facility provides coherent file data from said existing file system by means of a pager program located in said first layer, said pager program being connected to a cache program located in said second layer, said cache program supplying said coherent file data from said existing file system to said new file system.

2. The method described in claim 1 wherein said files in said existing file system remain directly accessible as well as accessible through said new file system.

3. The method described in claim 1 wherein said data movement facility provides coherent file attribute data from said existing file system by means of an attribute pager program located in said first layer, said attribute pager program being connected to an attribute cache program located in said second layer, said attribute cache program supplying said coherent file attribute data from said existing file system to said new file system.

4. The method described in claim 1 wherein said new file system can be implemented in a kernel of an operating system in said computer.

5. The method described in claim 1 wherein said new file system can be implemented in a user process in said computer.

6. The method described in claim 1 wherein said computer in which said new file system can be implemented, is a remote computer which does not contain said existing file system.

7. The method described in claim 1 wherein said new file system can be connected to said existing file system dynamically at system run time or statically at compile time.

8. The method described in claim 1 further comprising additional steps of interposing an additional file system in a third layer on top of said second layer containing said new file system and connecting said additional file system to said naming service and to said new file system.

9. The method described in claim 8 wherein said second layer containing said new file system which can cache coherent file data from said existing file system, can also act as a pager for supplying file data from said new file system to said third layer, said third layer also having the ability to cache said file data from said new file system for use by said additional file system.

10. The method described in claim 9 wherein said data movement facility coordinates said caching of said file data in said second layer and said third layer and provides the ability to maintain said cached file data coherent.

11. The method described in claim 10 wherein said coherent cached file data may be either file data or file attribute data.

12. The method described in claim 1 wherein said computer system is a distributed computer system with a plurality of computers.

13. The method described in claim 12 further comprising additional steps of implementing a plurality of additional file systems, each of which said additional file systems being implemented on a computer anywhere in said distributed computer system, and implementing each of said additional file systems as layers connected to each other in any order desired by an implementor wherein said connections are by means of naming services and data movement facilities capable of moving data from one layer to a next layer, and wherein a given layer may stack on more than one underlying layer.

14. In a computer system, having an existing file system located in a first layer connected to a naming service, an extensible file system comprising:

an identification device for identifying said existing file system by accessing said naming service to locate said existing file system;

a new file system coupled to said computer system said new file system located in a second layer, said first layer and said second layer being program code mechanisms which may reside in different computers;

a connecting mechanism coupled to said computer system for connecting said new file system to said naming service such that files in said existing file system can be accessed by reference to said new file system; and a data movement facility coupled to said computer system wherein said data movement facility provides coherent file data from said existing file system by means of a pager program located in said first layer, said pager program being connected to a cache program located in said second layer, said cache program supplying said coherent file data from said existing file system to said new file system.

15. In a distributed computer system having one or more computers, each computer having an operating system and an existing file system located in a first layer and a naming service which can map names to files, an extensible file system comprising:

an identification device in a computer for identifying a location of said existing file system by accessing said naming service on said computer;

a file system creation mechanism coupled to said computer for creating a new file system by creating an instance of said new file system which can be connected to said existing file system, wherein said new file system is located in a second layer, said first layer and said second layers being program code mechanisms which reside in different computers;

a connecting mechanism coupled to said computer for connecting said new file system to said naming service whereby a client can access files in said existing file system, file accesses being routed through said new file system without said client having any knowledge of said new file system; and a data movement facility coupled to said computer wherein said data movement facility provides coherent file data from said existing file system by means of a pager program located in said first layer, said pager program being connected to a cache program located in said second layer, said cache program supplying said coherent file data from said existing file system to said new file system; and wherein said data movement facility caches file attribute data in said second layer and maintains said cached file attribute data coherent with said files in said existing file system.

16. The extensible file system described in claim 15 wherein a client can access said new file system without having any knowledge of said existing file system.

17. The extensible file system described in claim 15 wherein said files in said existing file system remain directly accessible even when said new file system is interposed on top of said existing file system, with coherency of data in said files maintained when accessed by different file system layers.

18. The extensible file system described in claim 15 wherein the implementor of said new file system decides whether it is necessary to maintain files in said new file system coherent with said files in said existing file system, where a particular coherency procedure to be used is chosen by said existing file system in its capacity as a pager.

19. The extensible file system described in claim 15 wherein said new file system can be implemented in a kernel of an operating system in said computer.

20. The extensible file system described in claim 15 wherein said new file system can be implemented in a user process in said computer.

21. The extensible file system described in claim 15 wherein said computer in which said new file system can be implemented, is a remote computer which does not contain said existing file system.

22. The extensible file system described in claim 15 wherein said new file system can be connected to said existing file system dynamically at system run time or statically at compile time as the implementor of said new file system desires.

23. The extensible file system described in claim 15 further comprising an additional file system in a third layer which can be interposed on top of said second layer containing said new file system and connected to said naming service and to said new file system.

24. The extensible file system described in claim 23 wherein said second layer containing said new file system which can cache coherent file data from said existing file system, can also act as a pager for supplying file data from said new file system to said third layer, said third layer also having the ability to cache said file data from said new file system for use by said additional file system.

25. The extensible file system described in claim 24 wherein said data movement facility coordinates said caching of said file data in said second layer and said third layer and provides the ability to maintain said cached file data coherent.

26. The extensible file system described in claim 25 wherein said coherent cached file data may be either file data or file attribute data.

27. The extensible file system described in claim 15 further comprising a plurality of additional file systems, each of which said additional file systems can be implemented on a computer anywhere in said distributed computer system, and each of which said additional file systems can be implemented as layers connected to each other in any order desired by an implementor wherein said connections are by means of naming facilities and data movement facilities capable of moving data from one layer to a next layer.

* * * * *

UNITED STATES PATENT AND TRADEMARK OFFICE
CERTIFICATE OF CORRECTION

PATENT NO. : 5,561,799
DATED : October 1, 1996
INVENTOR(S) : Khalidi et al.

It is certified that error appears in the above-identified patent and that said Letters Patent is hereby corrected as shown below:

Title page,
Item [56], References Cited, OTHER PUBLICATIONS, "Znati et al." please delete "A Simulation Basen" and insert -- A Simulation Based --.

Signed and Sealed this

Sixth Day of August, 2002

Attest:

Attesting Officer

JAMES E. ROGAN
Director of the United States Patent and Trademark Office